United States Patent [19]

James et al.

[11] 3,945,892

[45] Mar. 23, 1976

[54] ELECTROCHEMICAL PROCESS AND APPARATUS INCLUDING MEANS FOR EQUALIZING PRESSURE ACROSS THE ION-PERMEABLE WALL

[75] Inventors: George Stephen James, Johannesburg; Bruce Ian Dewar, Randburg; Walter Rudolf Moergeli, Roodepoort, all of South Africa

[73] Assignee: Parel. Societe Anonyme, Luxembourg, Luxemburg

[22] Filed: July 30, 1974

[21] Appl. No.: 493,649

[30] Foreign Application Priority Data
Aug. 3, 1973  South Africa........................ 73/5311

[52] U.S. Cl.................. 204/1 R; 204/222; 204/257; 204/263
[51] Int. Cl.²......................................... C25B 15/08
[58] Field of Search ........... 204/251, 252, 257, 263, 204/266, 1 R, 222; 136/86 R

[56] References Cited
UNITED STATES PATENTS
3,134,697   5/1964   Niedrach........................... 136/86 R
3,220,941   11/1965  Osborne............................ 204/266 X R
3,660,259   5/1972   Danly et al....................... 204/263 X R FOREIGN PATENTS OR APPLICATIONS
600,441   6/1960   Canada............................... 204/252

*Primary Examiner*—Howard S. Williams
*Assistant Examiner*—W. I. Solomon
*Attorney, Agent, or Firm*—Armstrong, Nikaido & Wegner

[57]  ABSTRACT

There is disclosed an electrochemical process and cell, the electrochemical cell comprising an anode compartment through which flows an anolyte and a cathode compartment through which flows a catholyte separated, at least in part, by an ion-permeable wall, wherein the operating pressures within the anode compartment and the cathode compartment are controlled in a manner such that there is not a large difference of pressure across said ion-permeable wall. The operating pressures are advantageously controlled by a flow impeder constituted by a plurality of perforated plates or baffles disposed within an electrode compartment of the cell.

14 Claims, 5 Drawing Figures

ELECTROCHEMICAL PROCESS AND APPARATUS INCLUDING MEANS FOR EQUALIZING PRESSURE ACROSS THE ION-PERMEABLE WALL

BACKGROUND OF THE INVENTION

This invention relates to electrochemical processes and to electrochemical cells and more particularly, but not exclusively, is concerned with electrochemical processes and electrochemical cells employing particulate electrodes.

Some electrochemical cells, for example those where one of the electrodes is a fluidised bed electrode, have separate anode and cathode compartments, separated by a common ion-permeable wall, for example a semi-permeable wall. This ion-permeable wall is intended to prevent passage of solid particles and/or of specific species of ions from one compartment to the other. Further, it is often desired that the anolyte present in an anode compartment and the catholyte present in a cathode compartment be kept separate. More generally, it is often desirable to employ in separate electrode compartments electrodes of widely differing types. The nature of the electrodes may be so different that a significant pressure difference develops across the whole or part of the common ion-permeable wall; if formed from a delicate membrane, for example a semi-permeable membrane, the pressure difference is often sufficient to rupture the membrane.

SUMMARY OF THE INVENTION

According to a first aspect of the present invention there is provided in an electrochemical process conducted within an electrochemical cell comprising an anode compartment through which flows an anolyte and a cathode compartment through which flows a catholyte separated at least in part by an ion-permeable wall, the improvement which comprises controlling the operating pressure in said anode compartment and the operating pressure in said cathode compartment in a manner such that there is not a large difference of pressure across said ion-permeable wall.

According to a further aspect of the invention there is provided an electrochemical cell comprising an anode compartment through which, in use, there flows an anolyte and a cathode compartment through which, in use, there flows a catholyte separated, at least in part, by an ion-permeable wall, and further comprising means to control the operating pressure in said anode compartment and the operating pressure in said cathode compartment in a manner such that there is not a large difference of pressure across said ion-permeable wall when said electrochemical cell is in use.

DESCRIPTION OF THE PREFERRED EMBODIMENTS

In one embodiment of the invention, a flow-impeder is located in one compartment, which flow-impeder acts as a pressure regulator and can thus be arranged to control the pressures in the anode and cathode compartment. The flow-impeder may comprise a series of baffles, perforated plates or a packing. In another embodiment of the invention where one electrode is of the type comprising a bed of particles contacted by a stream of electrolyte, for example a fluidised bed electrode, there may be present in the other electrode compartment together with the counter electrode a bed of non-electrochemically active particles to provide similar pressure characteristics, so that the operating (otherwise called dynamic) pressures in the two compartments are controlled so as to be balanced. Balancing the operating pressures in the two compartments decreases the tendency for there to be migration of electrolytes and reactants between the anode and cathode compartments. In certain circumstances one might therefore be able to replace a semi-permeable membrane with a rather more coarse and robust ion-permeable wall for example a filter cloth or a perforated plate.

In embodiments of the electrochemical cell according to the present invention in which the flow-impeder takes the form of a series of perforated plates or baffles, it may be advantageous to dispose the perforated plates or baffles so that they are in close-fitting relationship with an electrode within the compartment and so that they slope upwardly away from the ion-permeable wall. This disposition ensures that if a gas is liberated at the electrode during the course of an electrochemical process conducted within the cell then it will be channelled away from the electrode and the ion-permeable wall, reducing its interference in the electrochemical process.

BRIEF DESCRIPTION OF THE DRAWINGS

For a better understanding of the invention, and to show more clearly how the same may be carried into effect, reference will now be made, by way of example, to the accompanying drawings, in which.

DETAILED DESCRIPTION OF THE DRAWINGS

Figure 1:
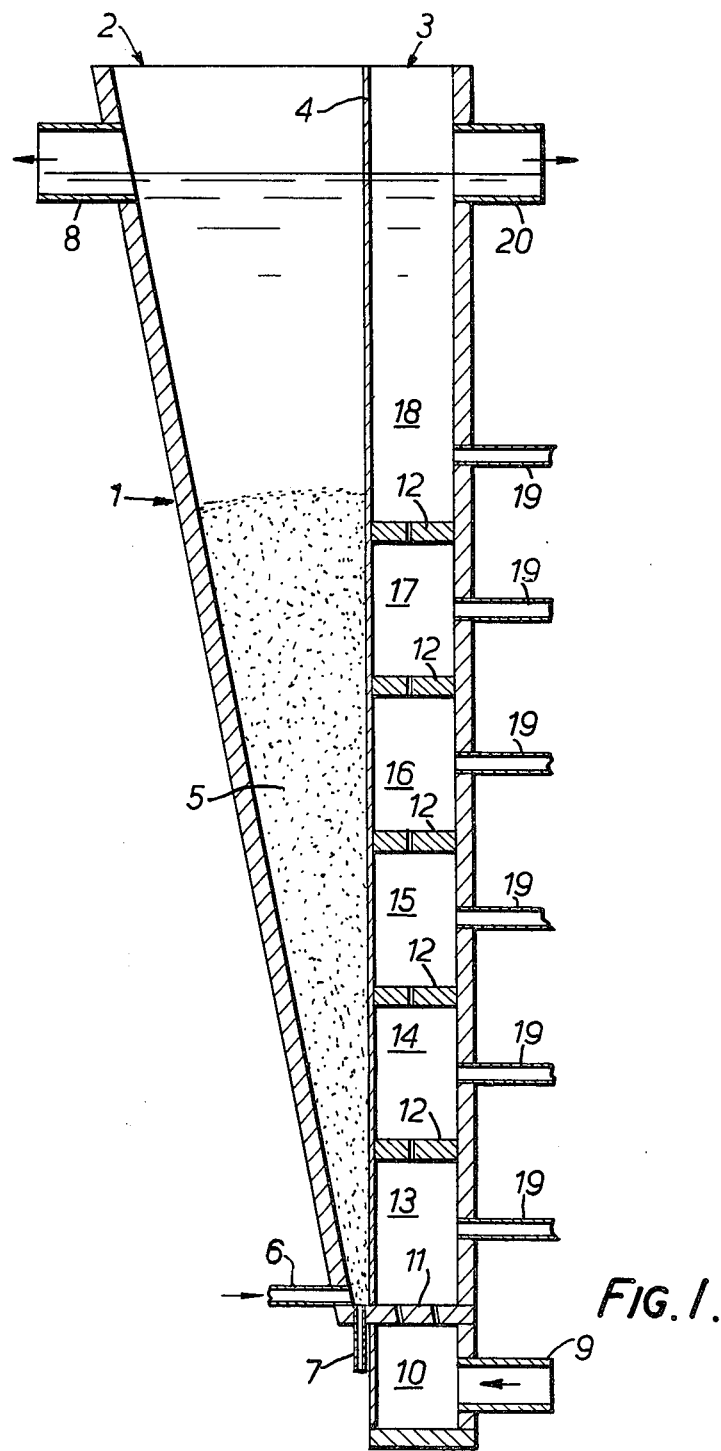
FIGS. 1, 2 and 3 show schematically vertical sections of three embodiments of electrochemical cells, the vertical sections being normal to the width of the cells and showing the thickness of the cells.

Referring first to FIG. 1, an electrochemical cell 1 comprises a first electrode compartment 2 and a second electrode compartment 3 separated by an ion-permeable wall 4 constructed from a filter cloth. The electrodes i.e., the anode and the cathode, which are disposed in the first and second electrode compartments, are not shown for the sake of greater clarity. The first electrode compartment 2, which is of truncated wedge-shaped section, contains a bed 5 of discrete, electroconductive particles. Inlet conduits 6 and 7 are provided at the base of the electrode compartment 2 and an outlet conduit 8 near the top of this compartment. The cell is provided with a second inlet conduit 9 which communicates with a chamber 10 the top of which forms a flow distributor 11 at the base of the second electrode compartment 3. Within the second electrode compartment 3 there are provided five substantially horizontal perforated plates 12 which thus form a number of sub-compartments 13–18 within the second electrode compartment 3. A pressure sensor 19 extends into each of these sub-compartments 13–18. Near the top of the second electrode compartment 3, there is provided an outlet conduit 20.

Figure 2:
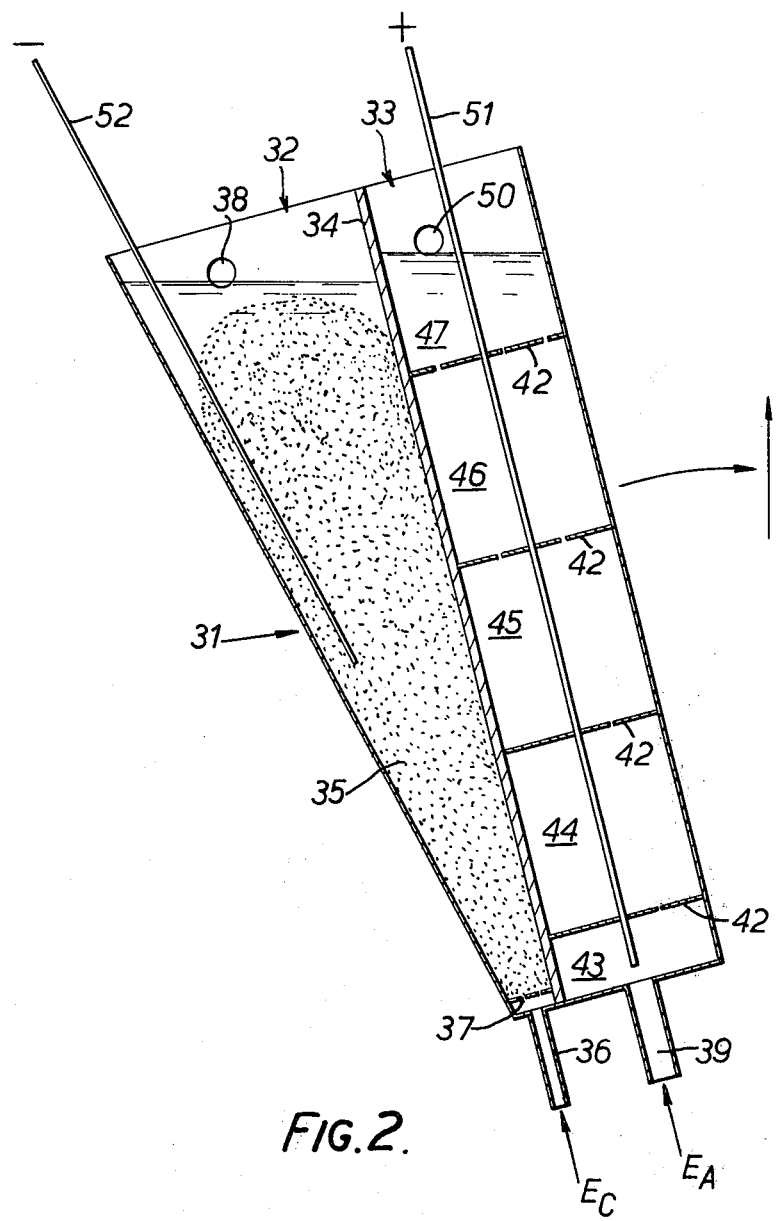

Reference is now made to FIG. 2, which shows another embodiment of electrochemical cell, in operation. The electrochemical cell 31 comprises a cathode compartment 32 and an anode compartment 33 separated by an ion-permeable wall 34 inclined towards the cathode compartment. A bed 35 of discrete, electroconductive particles is provided within the cathode compartment 32. An inlet conduit 36 issues via a flow distributor 37 into the base of this cathode compartment 32 which is further provided with an outlet conduit 38.

The anode compartment 33 has an inlet conduit 39 issuing into its base and four perforated plates 42 disposed within the compartment substantially normal to the ion-permeable wall 34 of the compartment. The perforated plates 42 form sub-compartment 43–47 within the anode compartment 33. An outlet conduit 50 is provided near the top of the anode compartment. Current conductors 51 and 52 extend into the anode compartment 33 and cathode compartment 32 respectively.

Figure 3:
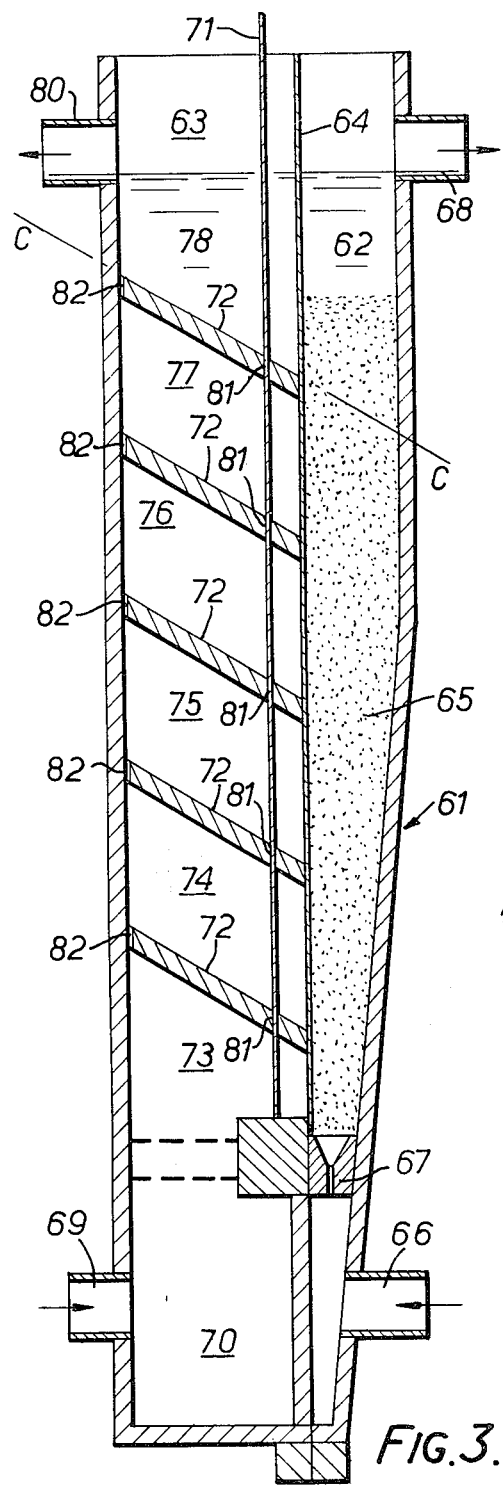

FIG. 3 shows a vertical section A—A of a further embodiment of electrochemical cell 61 comprising a first electrode compartment 62 and a second electrode compartment 63 separated by an ion-permeable wall 64. The first electrode compartment 62 is provided with a bed 65 of electroconductive particles, which, in operation constitutes a particulate electrode, an inlet conduit 66, a flow distributor 67 and an outlet conduit 68. In the interests of greater clarity, the current conductor, by which current is conducted to the bed 65 is omitted.

The electrochemical cell 61 includes a second inlet conduit 69 connecting with a chamber 70 disposed beneath the second electrode compartment 63. An anode 71 and five baffles 72 are disposed within the second electrode compartment, the baffles forming sub compartments 73–78 within the second electrode compartment. At the top of the second electrode compartment there is an outlet conduit 80.

Figure 4:
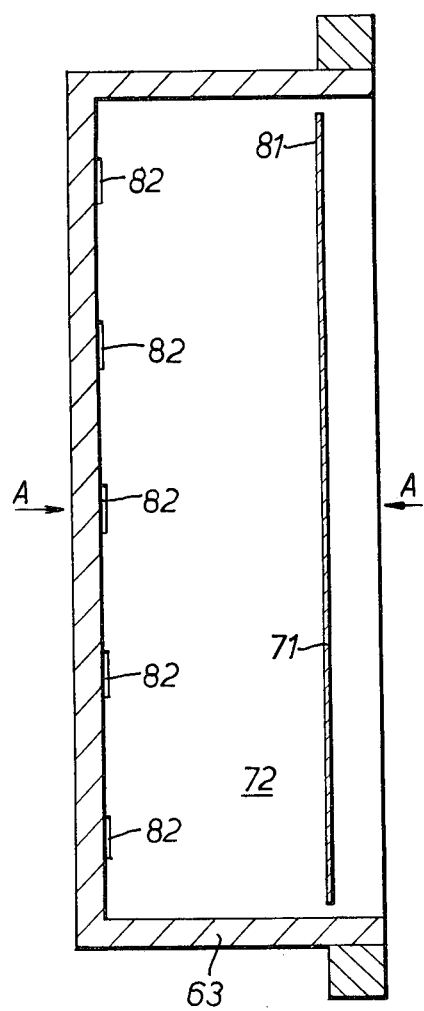
FIG. 4 shows a section of the cell of FIG. 3 taken along the line C—C of FIG. 3.

FIG. 4 shows more clearly the individual construction of one of the baffles 72. The baffles 72 fit closely inside the second electrode compartment 63 and in addition to one long slot 81 through which the anode 71 passes, each baffle is provided with a number of slots 82 disposed adjacent to the wall of the second electrode compartment 63 opposite the ion-permeable wall 64, thus providing for greater resistance to electrolyte flow adjacent the ion-permeable wall.

The operation of embodiments of electrochemical cell as shown in the drawings will now be described with reference to FIG. 1 of the drawings. However, operation of the embodiments of FIGS. 2 and 3 is similar.

In operation of the cell shown in FIG. 1, electrolyte is introduced to the first electrode compartment 2 through the inlet conduits 6 and 7. The electrolyte passes upwardly through the bed 5 of particles in the electrode compartment, causing the particles of the bed 5 to move and the volume of the bed 5 to increase. Under steady state conditions, the level of electrolyte in the electrode compartment 2 remains constant as electrolyte leaves the compartment through the outlet conduit 8 at the same rate as it enters the base of the electrode compartment. At the same time, a second electrolyte is passed through the second electrode compartment 3, though in some cases this second electrolyte may be identical to that flowing through the first electrode compartment. Electrolyte passes into the second electrode compartment 3 through the inlet conduit 9, chamber 10 and flow distributor 11. As it passes upwardly through the second electrode compartment 3, its flow is impeded by the perforated plates 12 so that the operating pressure of electrolyte in the sub-compartments 13–18 is larger than would be the case in the absence of baffles. Electrolyte leaves the second electrode compartment through an outlet conduit 20.

Due to the resistance in the bed 5 of particles in the first electrode compartment to fluid flow therethrough, the operating pressure in the first compartment 2 is larger than it would otherwise be, particularly towards the base of the compartment. By careful calculation of numbers, spacing and individual design of the perforated plates 12 and by adjustment of the flow rates of electrolyte, it is possible to balance the operating pressures in the two electrode compartments 2 and 3 so that there is little or no pressure difference across the ion-permeable wall 4. Pressure sensors 19 connecting with each of the sub-compartments 13–18 of the second electrode compartment 3 provide data on the pressure distribution within the compartment.

An electrochemical process may be conducted within the electrochemical cell 1 by imposing a suitable potential difference across the electrodes (not shown) of the electrochemical cell.

The embodiments of the electrochemical cell shown in FIG. 3 operates in a similar manner to that described above. However, it has particular use for electrochemical processes in which a gas is evolved at the anode. The sloping design of the baffles 72 and their close fitting relation to the anode 71 means that evolved gas is channelled away from the anode towards the slits 82 in the baffles. Channelling of evolved gas away from the vicinity of the anode can often result in improved efficiency of the electrochemical process being conducted. The electrochemical cell is readily adapted for use in conducting electrochemical processes in which gas is evolved at the cathode if the sign of the potential difference across the electrodes of the cell is reversed.

Figure 5:
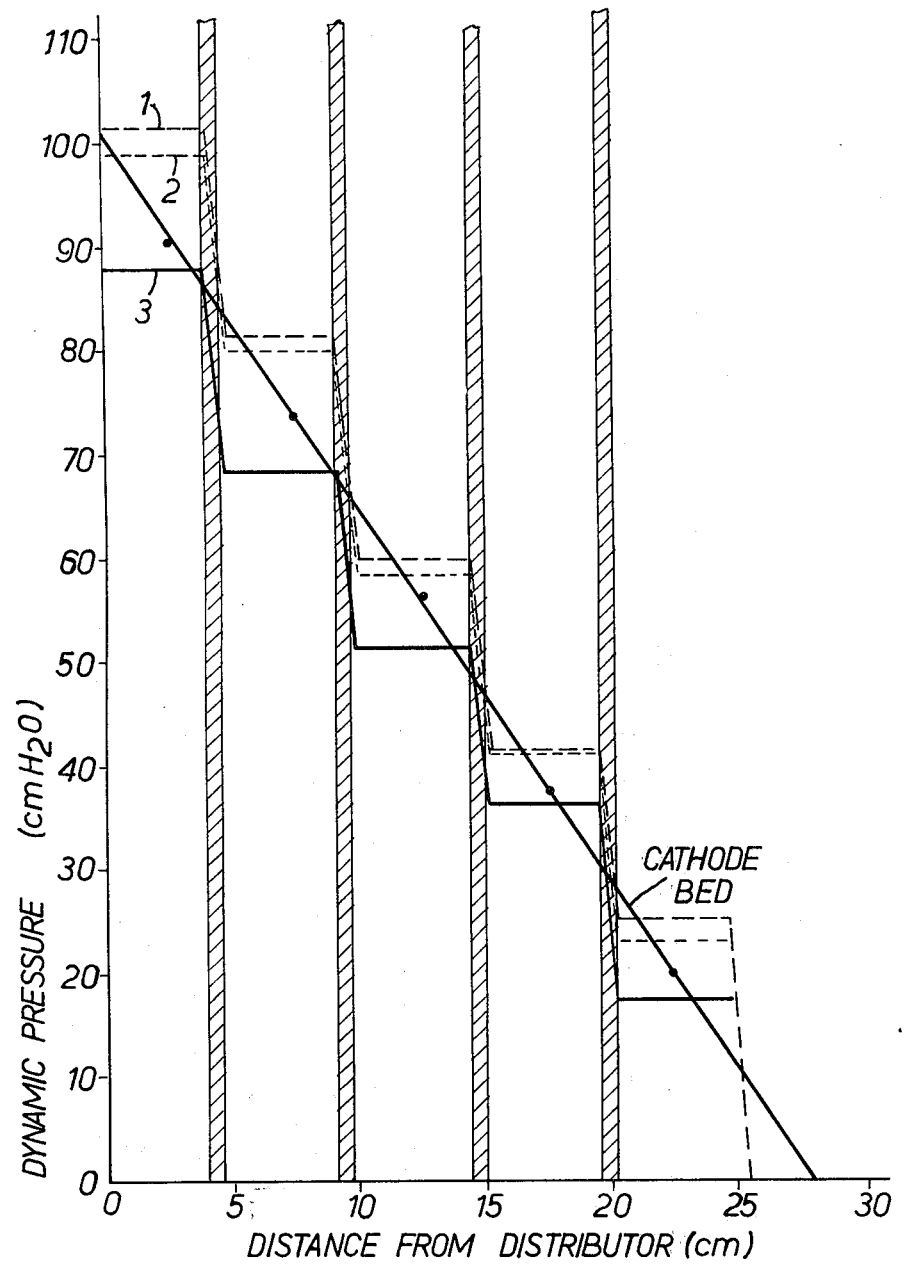
FIG. 5 shows the variation of operating or dynamic pressure in an electrochemical cell as shown in FIG. 3 as it varies with distance from the bases of the electrode compartments.

Referring now to FIG. 5, this Figure shows the relationship between the dynamic pressure within the bed 65 of particles in the first electrode compartment 62 in FIG. 3 and the dynamic pressure within each of the sub compartments 73–77 of the second electrode compartment 63 for three different rates of flow of electrolyte through this latter compartment. In the drawing, the stepped lines referenced 1, 2, and 3 represent flow rates of anolyte through the second electrode compartment of 21 liters/minute, 18 liters/minute and 14 liters/minute respectively. As can be seen, the stepped discontinuous variation of dynamic pressure in the second electrode compartment 63 approaches closely the substantially linear, continuous variation of dynamic pressure in the cathode bed of particles 65.

We claim:

1. In an electrochemical process conducted within an electrochemical cell comprising first and second electrode compartments separated by an ion permeable wall and wherein first and second electrolytes flow upwardly through said first and second electrode compartments, respectively; said first electrode compartment containing a particulate electrode consisting of a bed of discrete, electroconductive particles which are caused to move by the flow of said first electrolyte; and said second electrode compartment containing a non-particulate electrode; the improvement comprising impeding the upward flow of electrolyte in said second electrode compartment such that along said ion-permeable wall the pressure difference across the wall is less than that required to rupture the wall.

2. The electrochemical process of claim 1, wherein the second electrode compartment contains a plurality of baffles which act to impede the upward flow of electrolyte in the second electrode compartment, and wherein the resistance to the upward flow of electrolyte through said baffles is greatest adjacent said ion-permeable wall.

3. In an electrochemical cell comprising first and second electrode compartments separated by an ion-permeable wall, said first electrode compartment containing a particulate electrode consisting of a bed of discrete, electroconductive particles and having associated therewith means for causing an overall upward flow of fluid through the first electrode compartment whereby the particles of the particulate electrode are caused to move during use of the electrochemical cell, and said second electrode compartment containing a non-particulate electrode and having associated therewith means for causing an upward flow of liquid through said second electrode compartment, the improvement which comprises liquid flow impeding means disposed in said second electrode compartment so as to establish a gradient in the operating pressure in said second electrode compartment during use of the cell which is such that the difference in pressure across said ion-permeable wall at any particular point thereof is less than that required to rupture the wall.

4. The electrochemical cell of claim 3 wherein said flow impeding means comprises a bed of particles disposed in said second electrode compartment the particles having an electrochemical activity when the cell is in use of substantially zero.

5. The electrochemical cell of claim 4, including means to move the particles of the bed of particles in the second electrode compartment when the cell is in use.

6. The electrochemical cell of claim 3 wherein said fluid flow impeding means comprises a plurality of spaced apart baffles disposed within said second electrode compartment.

7. The electrochemical cell of claim 6 wherein said baffles comprise a plurality of perforated plates each of which extends over substantially the entire cross-sectional area of said second electrode compartment.

8. The electrochemical cell of claim 6 wherein each of said baffles abuts a portion of the surface of said ion-permeable wall and slopes generally upwardly away from said portion of the surface of the ion-permeable wall.

9. The electrochemical cell of claim 8 wherein said ion-permeable wall is inclined from the vertical so as to overlie the particulate electrode and each of said baffles is normal to said ion-permeable wall.

10. The electrochemical cell of claim 6 wherein said baffles fit closely around the non-particulate electrode disposed within said second electrode compartment.

11. An electrochemical cell comprising first and second electrode compartments each provided with a liquid inlet at the base thereof and a liquid outlet at the top thereof, and being separated by an ion-permeable wall, said first electrode compartment containing a particulate electrode consisting of a bed of discrete, electroconductive particles and having associated therewith means for causing an overall upward flow of liquid through the first electrode compartment whereby the particles of the particulate electrode are caused to move during use of the electrochemical cell and said second electrode compartment containing a generally planar, non-particulate electrode, said ion-permeable wall being inclined from the vertical to overlie the particulate electrode, said electrochemical cell further comprising a plurality of baffles disposed in said second electrode compartment said baffles spanning substantially the entire cross sectional area of said second electrode compartment and being provided with a means for receiving said generally planar non-particulate electrode in a snug fit.

12. The electrochemical cell of claim 11 wherein said baffles are substantially normal to said ion-permeable wall.

13. The electrochemical cell of claim 11 wherein said baffles comprise perforated plates.

14. The electrochemical cell of claim 11 wherein said baffles include an edge portion adjacent said ion-permeable wall and a further edge portion opposite said ion-permeable wall and wherein said further edge portion has disposed therein a plurality of slots.

* * * * *